US010010853B2

(12) United States Patent
Raynor et al.

(10) Patent No.: US 10,010,853 B2
(45) Date of Patent: Jul. 3, 2018

(54) REDUCTION OF SICL4 IN THE PRESENCE OF BCL3

(71) Applicant: Matheson Tri-Gas, Inc., Basking Ridge, NJ (US)

(72) Inventors: Mark W. Raynor, Longmont, CO (US); Daniel J. Tempel, Erie, CO (US); Junpin Yao, Longmony, CO (US); Larry Wagg, Longmont, CO (US); Adam Seymour, Longmont, CO (US)

(73) Assignee: Matheson Tri-Gas, Inc., Basking Ridge, NJ (US)

( * ) Notice: Subject to any disclaimer, the term of this patent is extended or adjusted under 35 U.S.C. 154(b) by 241 days.

(21) Appl. No.: 14/660,852

(22) Filed: Mar. 17, 2015

(65) Prior Publication Data

US 2015/0265996 A1    Sep. 24, 2015

Related U.S. Application Data

(60) Provisional application No. 61/954,599, filed on Mar. 18, 2014.

(51) Int. Cl.
| | |
|---|---|
| *B01J 19/02* | (2006.01) |
| *C01B 31/30* | (2006.01) |
| *C01B 35/06* | (2006.01) |
| *C10G 65/04* | (2006.01) |
| *B01D 9/00* | (2006.01) |
| *B01D 53/04* | (2006.01) |

(52) U.S. Cl.
CPC ............ *B01J 19/02* (2013.01); *B01D 9/0004* (2013.01); *B01D 53/0415* (2013.01); *C01B 35/061* (2013.01); *C10G 65/04* (2013.01); *B01D 2253/116* (2013.01); *B01D 2253/308* (2013.01); *B01D 2256/26* (2013.01); *B01D 2257/204* (2013.01); *B01J 2219/0204* (2013.01); *B01J 2219/0209* (2013.01); *B01J 2219/0218* (2013.01)

(58) Field of Classification Search
CPC .......... B01J 19/02; B01D 3/343; C01B 31/30; C01B 33/035; C01B 35/026; C01B 35/061
USPC ........................................................ 422/129
See application file for complete search history.

(56) References Cited

U.S. PATENT DOCUMENTS

| | | | |
|---|---|---|---|
| 2,369,212 A | 2/1945 | Cooper | |
| 2,832,672 A * | 4/1958 | Fetterley | C01B 21/064 264/125 |

(Continued)

FOREIGN PATENT DOCUMENTS

CN    WO2014000592    3/2014

*Primary Examiner* — Huy Tram Nguyen (57) ABSTRACT

The present invention relates, in general, to the purification of boron trichloride ($BCl_3$). More particularly, the invention relates to a process for minimizing silicon tetrachloride ($SiCl_4$) formation in $BCl_3$ production and/or the removal of $SiCl_4$ in $BCl_3$ product stream by preventing/minimizing the silicon source in the reaction chambers. In addition, a hydride material may be used to convert any $SiCl_4$ present to $SiH_4$ which is easier to remove. Lastly freeze separation would replace fractional distillation to remove $SiCl_4$ from $BCl_3$ that has been partially purified to remove light boilers.

5 Claims, 7 Drawing Sheets

(56) References Cited

U.S. PATENT DOCUMENTS

| | | | |
|---|---|---|---|
| 2,943,916 A | | 7/1960 | McElroy |
| 3,020,128 A | | 2/1962 | Adock |
| 3,025,139 A | * | 3/1962 | Davis ................... C01B 35/06 423/292 |
| 3,515,520 A | * | 6/1970 | Hervert ................. B01J 19/02 422/208 |
| 3,540,861 A | * | 11/1970 | Neal ..................... B28B 11/16 423/342 |
| 4,083,943 A | * | 4/1978 | Kinosz ................... C25C 3/04 422/231 |
| 4,112,057 A | * | 9/1978 | Lang ..................... C01B 33/04 423/342 |
| 4,676,967 A | | 6/1987 | Breneman |
| 4,713,230 A | * | 12/1987 | Doornbos ......... C01B 33/10784 423/341 |
| 5,552,039 A | | 9/1996 | McBrayer, Jr. |

\* cited by examiner

REDUCTION OF SICL4 IN THE PRESENCE OF BCL3

CROSS REFERENCE TO OTHER APPLICATIONS

This application claims benefit of priority to U.S. Provisional Application No. 61/954,599, filed Mar. 18, 2014, the disclosure of which is fully incorporated herein by reference.

BACKGROUND OF THE INVENTION

1. Field of the Invention

The present invention relates to an improved column reactor device and processes for the purification of boron trichloride ($BCl_3$). More particularly, the present invention relates to a device that minimizes silicon tetrachloride ($SiCl_4$) formation during $BCl_3$ production, and discloses processes for the removal of $SiCl_4$ from the $BCl_3$ product stream which may have been formed during the synthesis of $BCl_3$.

2. Description of the State of the Art

Boron trichloride ($BCl_3$) is a highly reactive compound packaged as a liquid under its own vapor pressure that has numerous diverse applications. It is used predominantly as a source of boron in a variety of manufacturing processes. For example, in the manufacturing of structural materials, $BCl_3$ is the precursor for chemical vapor deposition ("CVD") of boron filaments used to reinforce high performance composite materials. $BCl_3$ is also used as a CVD precursor in the boron doping of optical fibers, scratch resistant coatings, and semiconductors. Some of the non-CVD applications of $BCl_3$ are reactive ion etching of semiconductor integrated circuits and refining of metal alloys. In metallurgical applications, it is used to remove oxides, carbides, and nitrides from molten metals. In particular, $BCl_3$ is used to refine aluminum and its alloys to improve tensile strength.

There are known a number of processes for the production of $BCl_3$ for example, by chlorination of a borate ester, e.g., trimethyl borate, in a sealed tube. See, for example, U.S. Pat. No. 2,943,916. However, the most common technical process for the preparation of $BCl_3$ is the reaction of a boron compound, such as boron carbide ($B_4C$) with chlorine. In this process $BCl_3$ can be prepared by passing chlorine over mixtures of boron carbide and optionally carbon, packed within a quartz column, which is heated to elevated temperatures of at least 800° C. to 1,200° C. Once the reaction is established, the reaction zone propagates slowly down the column generating $BCl_3$ at the reaction zone. The chlorination reaction results in the formation of $BCl_3$ having impurities such as unreacted chlorine ($Cl_2$), hydrogen chloride (HCl), and phosgene ($COCl_2$) which are generally removed from the raw $BCl_3$ stream through distillation and/or other purification methods. However, trace amounts of silicon tetrachloride ($SiCl_4$) are also produced and are much more difficult to remove from the product stream by the above described means due to its low volatility. The crude product, i.e., $BCl_3$ containing the $SiCl_4$ byproduct, is useful for some purposes; but, for many uses, $SiCl_4$ is an undesirable impurity, e.g., when $BCl_3$ is used as a precursor for high purity boron nitride. Therefore, its minimization during synthesis in the packed column reactor and its removal from the resulting $BCl_3$ product stream is highly desirable.

Boron trioxide ($B_2O_3$) typically exists in boron carbide as an impurity with content varying from 1% (wt) to 5% (wt). Boron trioxide has a melting point temperature of about 450° C. or about 510° C. depending on its crystal structure. Hence, under the reaction condition as mentioned above, the impurity $B_2O_3$ in $B_4C$ melts and forms a liquid in the $B_4C$ chlorination process. The liquidized $B_2O_3$ in the process stream eventually forms deposits as the process temperature is below its melting point. The deposits may block the process stream flow as they are continuously accumulated after multiple reaction cycles. Typically, an activated carbon (such as charcoal) bed is loaded at the bottom of the reactor to adsorb liquidized $B_2O_3$. In the major section of the reactor, once the reaction is triggered, through induction heating, a porous carbon frame (graphite) is formed after boron is chlorinated and depleted from $B_4C$. The presence of carbon (the carbon in the activated carbon bed and the carbon formed during the chlorination process) has a detrimental impact on $BCl_3$ purity, i.e., carbon can enhance the chlorination of quartz ($SiO_2$) at the $B_4C$ chlorination temperature of least 800° C. to 1,200° C. resulting in the formation of $SiCl_4$, a highly undesirable impurity in $BCl_3$, according to the reaction below:

$$SiO_2 + C + 2Cl_2 = SiCl_4 + CO_2; \Delta H° (1223\ K) = -141.7\ kJ/mol$$

Glow Discharge Mass Spectrometry (GDMS) analysis indicates that silicon also exists in boron carbide (0.38% (wt) in one batch of boron carbide sampled). Hence, the $SiCl_4$ in the $BCl_3$ stream may also be attributed to the silicon impurity in $B_4C$ (the source material of $BCl_3$).

Therefore, there is a need to have a reactor for synthesizing $BCl_3$ in the absence of a silicon source and/or a process for the removal of any $SiCl_4$ impurities that may form during the synthesis processes.

BRIEF SUMMARY OF THE INVENTION

Accordingly, a process for the production of boron trichloride ($BCl_3$) by the reaction of boron carbide ($B_4C$) with chlorine at a temperature of 800° C. to 1200° C. is disclosed herein using a reactor that either eliminates the silicon source resulting from the reactor by forming the reactor from a non-quartz material or applying a protective barrier to the quartz surface which is inert to chlorine attack at reaction conditions to prevent/minimize silicon tetrachloride ($SiCl_4$) formation.

Alternatively, in the case that quartz has to be used, employing an appropriate reactive material or adsorbent material to remove $SiCl_4$ and other silicon chlorides from the $BCl_3$ stream;

Alternatively, if the silicon contribution from the quartz reactor is minimized, and the formation of $SiCl_4$ is via the silicon impurity in $B_4C$, similar to the above method, an appropriate reactive material or adsorbent material can be used to remove $SiCl_4$ from the $BCl_3$ product stream. In this instance, the present invention teaches the use of a hydride reducing agent to convert $SiCl_4$ to $SiH_4$, which is easier to separate from $BCl_3$ than $SiCl_4$. The hydride can readily be treated for disposal in the gas phase through controlled oxidation (e.g. exposure of low concentrations to air or burning in the presence of a fuel source), scrubbing with a liquid phase oxidizing medium (e.g. aqueous $KMNO_4$ or NaOCl), scrubbing with a solid phase medium (e.g. Cu(OH)$_2$), or other acceptable method.

In yet another embodiment, $SiCl_4$ may be further removed from a $BCl_3$ stream by freeze purification. Atmospheric pressure boiling points for $BCl_3$ and $SiCl_4$ are about 12.6° C. and 57.65° C., respectively. Freezing points are about −107.3° C. and −68.74° C. This suggests that solid $SiCl_4$ may be removed by condensing and cooling the $BCl_3$ product.

Additional embodiments and features are set forth in the description that follows, and in part will become apparent to those skilled in the art upon examination of the specification or may be learned by the practice of the disclosed embodiments. The features and advantages of the disclosed embodiments may be realized and attained by means of the instrumentalities, combinations, and methods described in the specification.

BRIEF DESCRIPTION OF THE DRAWINGS

The accompanying drawings, which are incorporated in and form a part of the specification, illustrate the preferred embodiments of the present invention, and together with the description serve to explain the principles of the invention.

In the Drawings

DETAILED DESCRIPTION OF THE INVENTION

It has now been discovered that the presence of the silicon tetrachloride ($SiCl_4$) impurity found in boron trichloride ($BCl_3$) can be minimized during the synthesis of $BCl_3$ and/or removed from the $BCl_3$ product stream thus producing a purified $BCl_3$.

In accordance with the present invention, the silicon source attributable to the reactor is either eliminated by constructing a reactor column from a non-quartz material which is inert to chlorine attack at reaction conditions or minimized by inserting an protective coating or barrier between the interior sidewall of the column reactor and the reactive material used for the synthesis of $BCl_3$, such as but not limited to boron carbide. This protective coating or barrier thereby minimizes the formation of impurities (such as $SiCl_4$) that are generated by the reaction of the interior quartz reactor walls with reactive chemical species within the reactor. It should be understood and appreciated that the embodiments and/or features of the present invention disclosed herein may be freely combined with one another.

Figure 1:
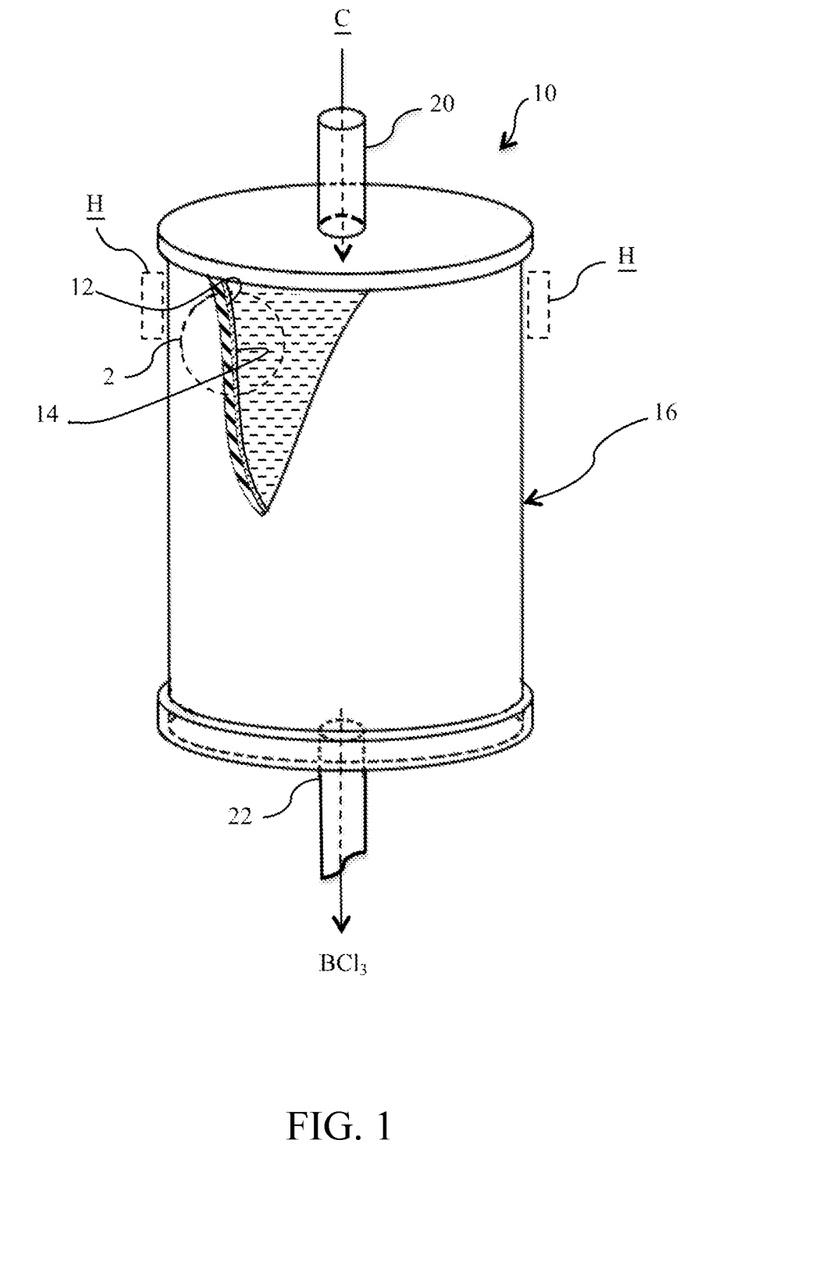
FIG. 1 is a perspective view of the column reactor device of the present invention, with portions cut away to reveal the internal structure as assembled.

In one embodiment, the reactor 10 of the present invention, as shown in FIG. 1, makes use of an inert non-reactive material 14 that shows resistance to chlorine attack, such as but not limited to graphite, graphene, or silicon oxynitride, or refractory ceramic materials to form a dense nonporous thin protective coating or layer on the inner surface 12 of quartz column 16. The ceramics useful in this invention include but are not limited to silicon carbide, zirconium carbide, zirconium nitride, silicon nitride, or boron nitride. Such a protective coating 14 must have close thermal properties to quartz to avoid/minimize lamination and/or stress/tension due to thermal expansion at elevated temperatures.

Figure 2A:
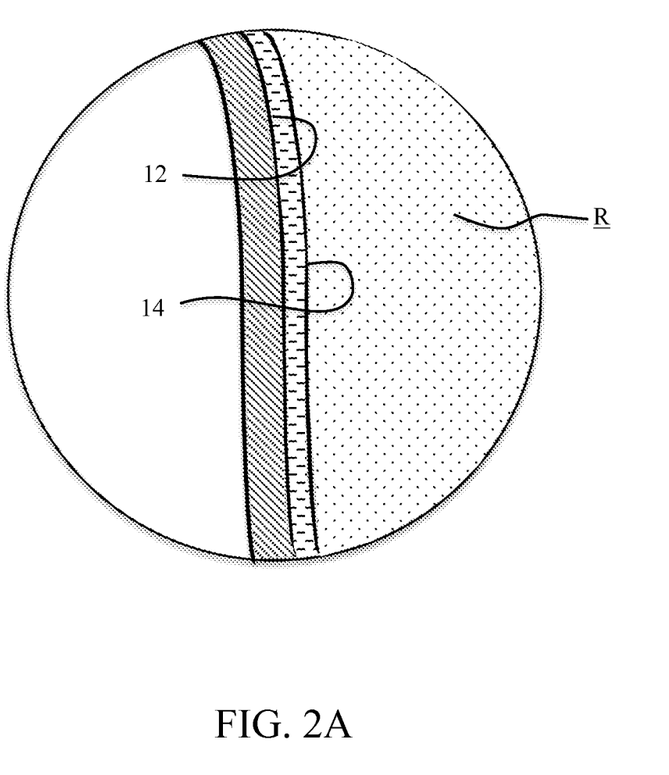
FIG. 2A is an enlarged, detailed view of the protective coating of the column reactor device of FIG. 1 indicated by dashed lines in FIG. 1.

The protective coating 14, best seen in FIG. 2A, is juxtaposed between the interior surface 12 of the interior reactor 10 wall and the reactive material R, such as, but not limited to a boron compound such as boron carbide ($B_4C$). Typically, protective coating 14, such as a graphene coating is formed by a chemical vapor deposition (CVD) process using methane or ethanol as a precursor at temperatures near 1000° C. on the interior surface 12 of quartz column 16 having an interior surface and an exterior surface. Alternatively, the protective coating 14 may be a silicon oxynitride layer formed on the interior surface 12 of the quartz material by rapidly flowing ammonia gas at 1200° C. A dense refractory ceramic coating typically is formed by a CVD process with appropriate precursors. For instance, a thin layer of boron nitride can be deposited on a quartz column surface by the chemical reaction between boron trichloride (or other boron compounds and ammonia. Alternatively, one or more additional coating layers (not shown) may be formed over the protective coating 14 on the interior surface 12 of the quartz column 16.

Figure 2B:
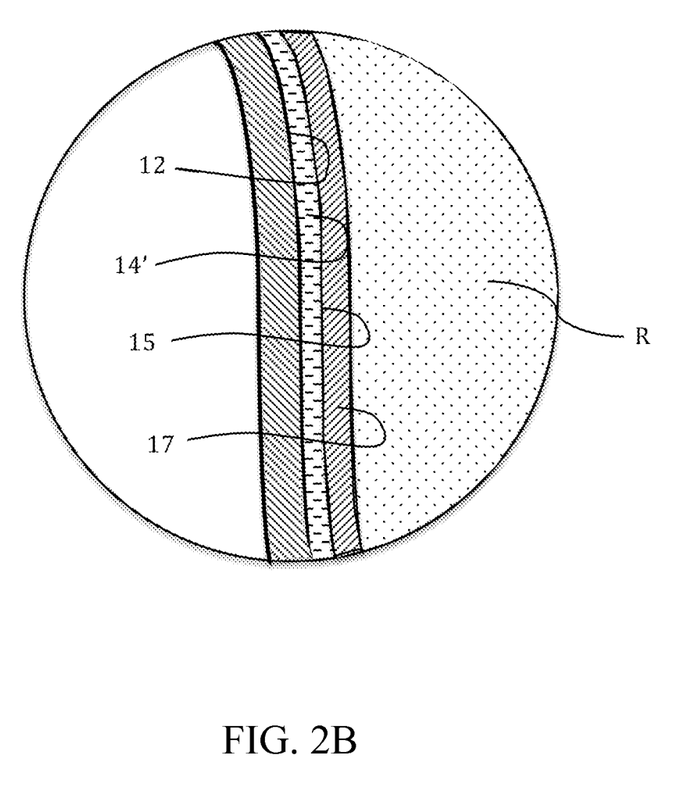
FIG. 2B is an enlarged, detailed view of the present invention similar to the view shown in FIG. 2A, but having multiple protective coatings overlying one another.

If reactor 10 includes one or more different coatings 17 overlying and/or underneath the surface 15 of protective coating 14' deposited on interior surface 12 of the quartz column 16, as shown in FIG. 2B, the various coatings may be formed as adjacent layers overlying one another sequentially, or one or more of the coatings may penetrate into or even through one or more of the other coatings. Accordingly, the various coatings may be fairly described as being formed generally "on" or "over" the column, regardless of how or to what extent any given coating contacts any of the other coatings and/or the column itself. Similarly, when a material is described as being applied generally to the column, the material may be applied directly to the quartz column, or the material may be applied to the quartz column over one or more coatings already present on the quartz column.

Figure 2C:
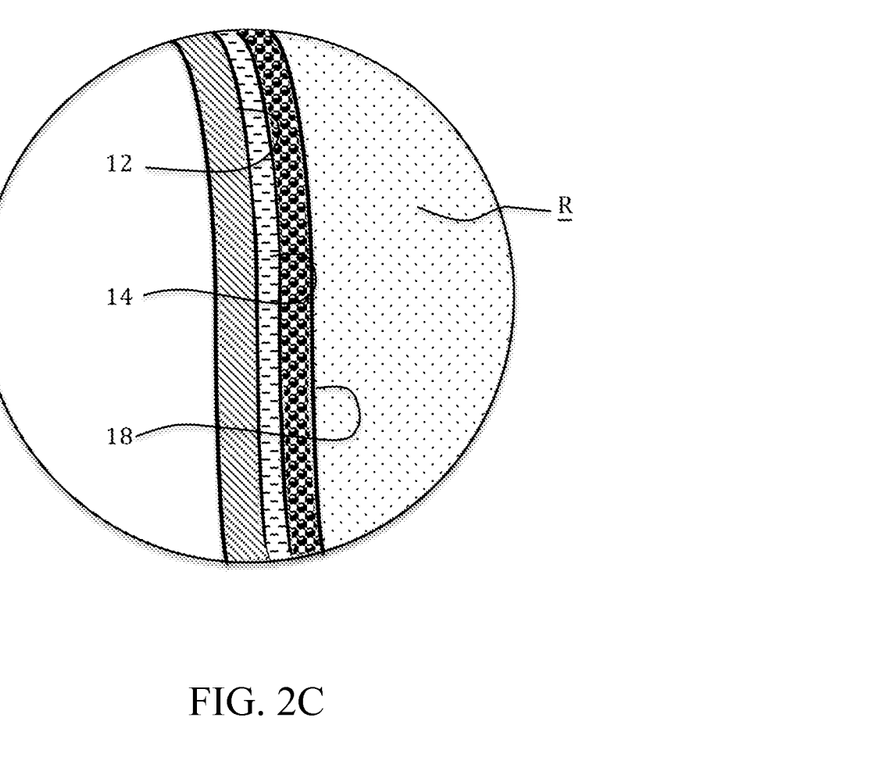
FIG. 2C is an enlarged, detailed view of the protective coating of the present invention similar to the view shown in FIG. 2A having an alternative protective barrier in contact with the surface of the protective coating.
Figure 2D:
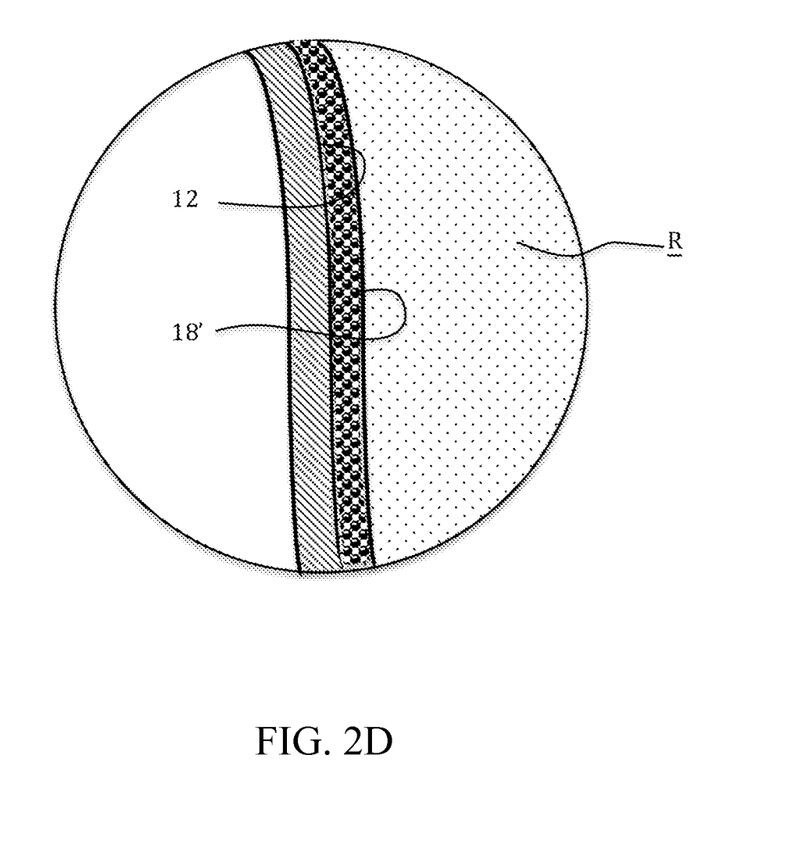
FIG. 2D is an enlarged, detailed view of the present invention as shown in FIG. 2C illustrating an alternative embodiment wherein the protective coating is absent and the protective barrier is in direct contact with the interior column reactor sidewalls and the reactive media.
Figure 4:
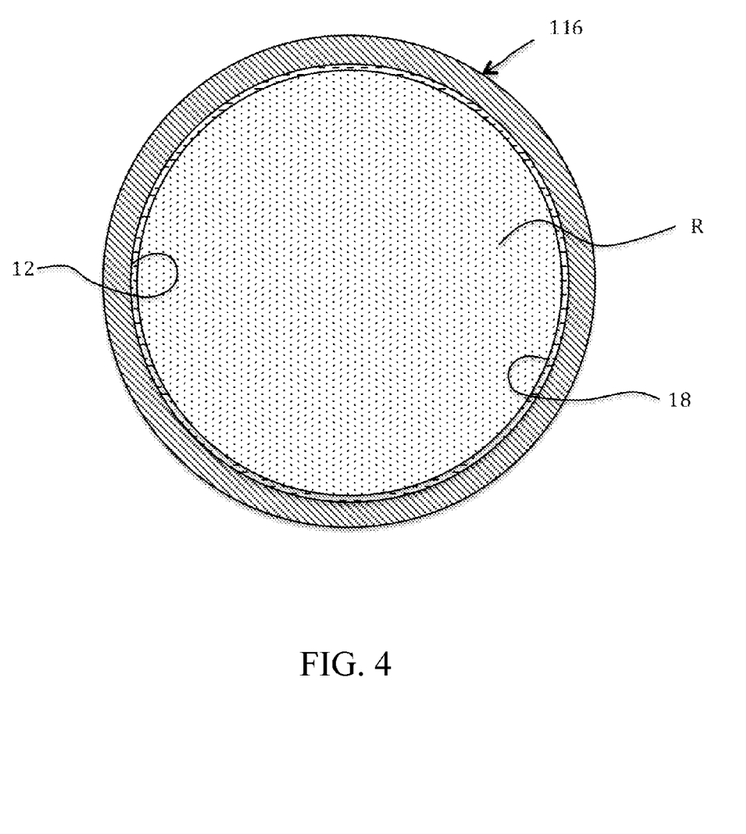
FIG. 4 is a top plan view of the column reactor device shown in the position illustrated in FIG. 3.

In another embodiment, shown in FIG. 2C, the surface temperature of quartz column 16 can be reduced by packing a concentric ring of larger diameter, and/or less porous, and/or lower reactive particles, such as, but not limited to boron nitride, pure boron, etc. into quartz column 16 to form a barrier 18 between the protective coating 14 of quartz column 16 and reactive material R, such as boron carbide ($B_4C$). Alternatively, barrier 18' can be formed in direct contact with the interior surface 12 of column 16, as shown in FIG. 2D. This concentric ring of material, as best shown in FIG. 4, may be formed in juxtaposition with the interior sidewall surface 12 of quartz column 16 or it may have a graphite, graphene, or silicon oxynitride, or refractory ceramic materials interposed between it and the quartz surface, as shown in FIG. 2C. In another embodiment, not shown, a barrier may be formed within column 16 using a non-reactive tube, as opposed to loose particles which are packed into column 16. In this embodiment the exterior diameter of the tubular barrier would be slightly less than the inner diameter of column 16 so that when slid into place, the exterior surface of the tubular barrier would be in contact with the interior surface of column 16. In the event the exterior diameter of the tubular barrier is significantly less than the interior diameter of column 16 then the concentric annular space or gap that is formed can further be pack with a ring of larger diameter, and/or less porous, and/or lower reactive particles such as those that were used to describe barrier 18 above.

By using an embodiment of reactor 10 as disclosed herein, $BCl_3$ can be prepared by introducing chlorine gas C through gas inlet 20 thus passing over boron carbide and optionally carbon, packed within quartz column 16, which is heated, using inductive heating H (FIG. 1), to elevated temperatures of at least 800° C. to 1,200° C. Once the reaction is established, the reaction zone propagates slowly down the column generating $BCl_3$ at the reaction zone. The chlorination reaction results in the formation of $BCl_3$ and the presence of the silicon tetrachloride ($SiCl_4$) impurity typically found in $BCl_3$ is minimized during the synthesis of $BCl_3$ as a result of the protective barrier that is established between the reactive materials and the quartz substrate. As will be disclosed in further detail below due to the presence of a silicon source in the reactive material R, any $SiCl_4$ that is eventually formed may be removed using the process described herein thereby producing a purified $BCl_3$ which exits reactor 10 by way of gas outlet 22.

Figure 3:
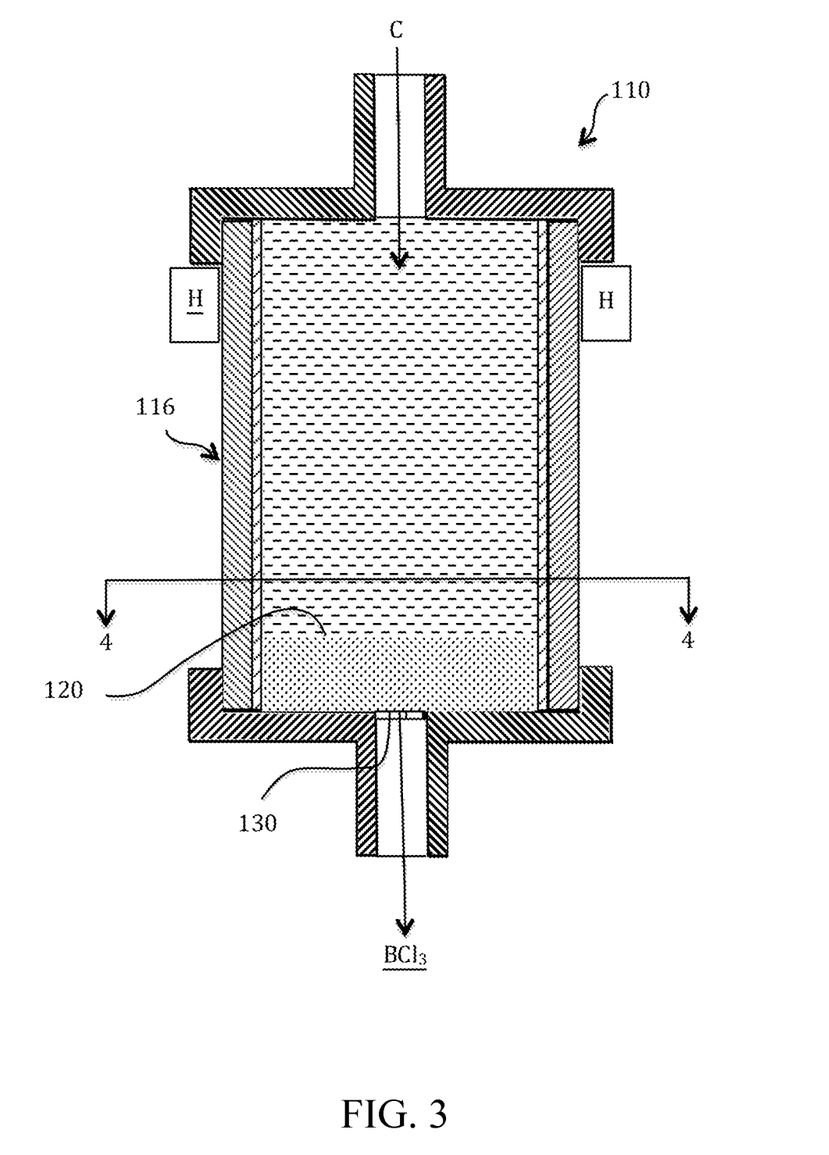
FIG. 3 is a side, cross-sectional view of the filter of FIG. 2D, with the addition of a filter bed.

As discussed previously, regardless of the steps taken to eliminate the silicon source that results from the reactor, $SiCl_4$ impurities may still form due to the presence of a silicon source in the $B_4C$. Therefore, the present invention further contemplates processes for purifying the $BCl_3$ product to remove any $SiCl_4$ impurity formed regardless of whether the interior sidewalls of the column are protected by a coating or a barrier as discussed above. The following embodiment as shown in FIG. 3 contemplates having a protective coating or barrier; however, one skilled in the art will also recognize that the purification bed, as disclosed herein, could also be used in a standard quartz column (not shown). As shown in FIG. 3 and in accordance with the present invention a thin pure boron zone 120 or purification bed is formed at the bottom of reactor 110 and maintained within quartz column 116 using a ceramic frit or alternatively boron is placed in a heated separate bed (not shown) to react with any $SiCl_4$ to form $BCl_3$ and solid Si, so that $SiCl_4$ impurity is removed from the $BCl_3$ stream. Alternatively, proper molecular sieve materials having good affinities for $SiCl_4$ and appropriate pore size to let $SiCl_4$ molecules diffuse into the pores and be adsorbed on the internal surfaces of the adsorbent materials but exclude $BCl_3$ molecule to enter the pores (the kinetic diameter of $SiCl_4$ and $BCl_3$ is 5.81 Å and 6.00 Å, respectively) can be utilized.

Purification bed 120 may also be formed using a reactive elemental material, mixed material or other compound to react with $SiCl_4$ to form, e.g. $M_xCl_y$, wherein x=1-4 and y=1-8 and elemental silicon such that the $SiCl_4$ present as an impurity in $BCl_3$ is substantially removed. The reactive material is at least partially consumed and acts as a $SiCl_4$ getter. The byproduct or byproducts of reaction may need to be separated from $BCl_3$, but this should be more convenient than separation of $SiCl_4$. Preferred materials are elemental titanium (e.g. Ti sponge), 90% NaCl/10% elemental boron, elemental zinc (e.g. molten), and alumina ($Al_2O_3$).

A hydride reducing agent may further be used to convert $SiCl_4$ to $SiH_4$, which is easier to separate from $BCl_3$ than $SiCl_4$. The hydride can readily be treated for disposal in the gas phase through controlled oxidation (e.g. exposure of low concentrations to air or burning in the presence of a fuel source), scrubbing with a liquid phase oxidizing medium (e.g. aqueous $KMnO_4$ or NaOCl), scrubbing with a solid phase medium (e.g. $Cu(OH)_2$), or other acceptable method. Without wishing to be bound by theory, general reaction schemes may include, for example:

$SiCl_4 + 4MH \rightarrow SiH_4 + 4MCl$
$SiCl_4 + 2MH_2 \rightarrow SiH_4 + 2MCl_2$
$SiCl_4 + MM'H_4 \rightarrow SiH_4 + MCl + M'Cl_3$
$SiCl_4 + 4MR_2H \rightarrow SiH_4 + 4MR_2Cl$
$SiCl_4 + 4MM'R_3H \rightarrow SiH_4 + 4MCl + 4M'R_3$ Where M comprises an alkaline earth metal, alkali metal or other main group metal or metalloid, and R comprises a hydrocarbyl group.

The hydride reducing agent may include, but is not limited to, one or more of the following: LiH, NaH, KH, $CaH_2$, $LiAlH_4$, $NaBH_4$, diisobutylaluminum hydride (DIBAL), and lithium triethylborohydride ($LiB(Et)_3H$). Other hydride reducing agents not included in this list may also be effective. Ideally, the reducing agent will have a high selectivity for $SiCl_4$ over $BCl_3$ and will yield a byproduct or byproducts that do not have a significant negative impact on subsequent processing.

The best choice from the standpoint of reactivity and byproduct formation may be $NaBH_4$, as this is less reactive than the alkaline and alkali earth hydrides and would generate NaCl and $BCl_3$. DIBAL may also be a good choice, as the byproduct, diisobutylaluminum chloride, is a very high boiling liquid that would not generate solids in the process.

$SiCl_4$ may be further removed from a $BCl_3$ stream by freeze purification. Atmospheric pressure boiling points for $BCl_3$ and $SiCl_4$ are about 12.6° C. and 57.65° C., respectively. Freezing points are about −107.3° C. and −68.74° C. This suggests that solid $SiCl_4$ may be removed by condensing and cooling the $BCl_3$ product.

Without further elaboration it is believed that one skilled in the art can, using the description set forth above, utilize the invention to its fullest extent.

Having disclosed several embodiments, it will be recognized by those of skill in the art that various modifications, alternative constructions, and equivalents may be used without departing from the spirit of the disclosed embodiments. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the dielectric material" includes reference to one or more dielectric materials and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A quartz column reactor device, for use in forming a purified boron trichloride comprising:
    a gas inlet and a gas outlet;
    a quartz column reactor having inner sidewalls and outer sidewalls; and
    a purification bed wherein said purification bed comprises pure boron in addition to a mixed material or other compounds to react with SiCl4 and an adsorbent wherein said adsorbent comprises molecular sieve materials having affinities for SiCl4 and appropriate pore sizes to exclude $BCl_3$ molecules while allowing $SiCl_4$ molecules to diffuse into said pores and be adsorbed on the internal surface of said adsorbent material.

2. The reactor device of claim 1, wherein said pore size of adsorbent material is less than 6.00 Å.

3. The reactor device of claim 1, wherein said other compounds comprise elemental titanium, 90% NaCl/10% elemental boron, elemental zinc, alumina ($Al_2O_3$), a hydride reducing agent and/or combination thereof.

4. The reactor device of claim 3, wherein said reducing agent comprises LiH, NaH, KH, $CaH_2$, $LiAlH_4$, $NaBH_4$, diisobutylaluminum hydride (DIBAL), lithium triethylborohydride ($LiB(Et)_3H$) and/or combinations thereof.

5. The reactor device of claim 1, wherein said quartz column further comprises a refractory ceramic material selected from the group consisting of silicon carbide, zirconium carbide, or zirconium nitride, or silicon nitride, or boron nitride formed over the surface of said inner sidewalls.

* * * * *